United States Patent [19]

Church

[11] Patent Number: 4,463,243

[45] Date of Patent: Jul. 31, 1984

[54] WELDING SYSTEM

[75] Inventor: John G. Church, Thornhill, Canada

[73] Assignee: T.I.M.E. Welding Gas Corporation, Toronto, Canada

[21] Appl. No.: 404,722

[22] Filed: Aug. 3, 1982

Related U.S. Application Data

[63] Continuation-in-part of Ser. No. 235,220, Feb. 17, 1981, abandoned.

[51] Int. Cl.³ .................................................. B23K 9/16
[52] U.S. Cl. ................................... 219/74; 219/130.51; 252/372
[58] Field of Search ................... 219/72, 74, 137 PS, 219/130.51; 252/372

[56] References Cited

U.S. PATENT DOCUMENTS 2,753,427  7/1956  Yenni et al. ..................... 252/372 X

OTHER PUBLICATIONS

Brosilow, R., "Gases for Shielded Metal Arc Welding," *Welding Design & Fabrication*, Oct. '78, pp. 53–72.
Crichton, A., "Selecting Shielding Gases," *Metal Progress*, Dec. '75, pp. 50–53.

*Primary Examiner*—Roy N. Envall, Jr.
*Assistant Examiner*—Catherine M. Sigda
*Attorney, Agent, or Firm*—Cullen, Sloman, Cantor, Grauer, Scott and Rutherford

[57]  ABSTRACT

An electric arc welding gas system utilizing a welding gas comprising a mixture of argon, helium, carbon dioxide and oxygen; electrode currents in the range of 100 to 1100 amperes so as to form electrode metal globules of at least the size of the electrode diameter at the rate of 400 to 1200 globules per second.

11 Claims, 24 Drawing Figures

WELDING SYSTEM

This application is a continuation-in-part of applicant's application Ser. No. 235,220, filed on Feb. 17, 1981, now abandoned.

TECHNICAL FIELD

The subject matter of the invention relates to arc welding and, more specifically, to a process known generally as Gas Metal-Arc (GMA) Welding.

GMA welding is the process wherein the heat for welding is generated by an electric current flowing between a consumable electrode and a spaced workpiece. The electrode is consumed as it is continuously fed to the weld area and becomes the filler material which mixes or alloys with the substrate material to form a welded joint. The weld puddle or molten material is protected from contamination by a gaseous shield comprised of a gas stream surrounding the electrode and the weld puddle.

The present invention relates to a unique combination of welding gases, electrode diameters and current densities which result in an improved weld joint formed at a weld deposition rate substantially faster than that achieved by known GMA welding processes. As will be more apparent hereinafter, the present welding gas system products: better weld geometry; sulphur-free weld deposits; greatly improved physical properties of weld joints compared to conventional shielding gas mixtures; and penetration sufficient to produce 100% welds of good fusion in plates up to $\frac{1}{2}$" thickness with one bead on either side of a butt joint and with no advanced preparation of the plates. The subject process is particularly useful in the welding of low carbon mild steels, medium and high carbon steels, low alloy high strength steels and is also applicable to stainless steel, copper and various alloys with excellent results.

BACKGROUND ART

In general there are three types of GMA welding processes differentiated by their arc characteristics and the manner in which metal is transferred from the consumable electrode to the work piece.

The first of such metal transfer processes is known as Spray Arc wherein metal is transferred from the end of the electrode to the work piece or molten puddle in a stream or series of small molten droplets. The Spray Arc transfer occurs at what have heretofore been considered to be relatively high current densities but not generally exceeding 130,000 amperes/square inch (electrode cross section area) and with a weld deposition rate of 0.12 to 0.30 pounds/minute. Typically, electrode wire diameters vary from 0.030 inch to 1/16 (or 0.062) inches with voltages of from 15 to 36 volts. The transfer is normally in an argon or argon-rich gas.

The next process is referred to as Globular transfer wherein a relatively large globule forms at the end of the electrode and falls to the work piece when the force of gravity overcomes the surface tension of the molten drop. As the globule is transferred across the arc, it is subjected to forces in the arc and takes on an irregular shape and rotating motion. This sometimes causes the globule to reconnect with the electrode and the substrate and causes a short circuit which momentarily extinguishes the arc. Globular transfer occurs at lower current densities than with Spray Arc and can take place with a variety of shielding gases.

The third process is known as Short Circuit transfer which, because of relatively low transfer heat, is particularly useful in welding thin sections. In the Short Circuit transfer a globule of liquid metal forms at the end of the electrode and gradually elongates and moves toward the work piece until it makes contact to create a short circuit. The metal transfer is again by gravity and surface tension. When the globular bridge between the electrode and work piece is broken by a pinch force, the arc is interrupted after which the arc is renewed and the cycle begins again. Normally this type of transfer occurs in carbon dioxide, argon/carbon dioxide or helium base shielding gases. If employed with high current densities and normal arc voltages, the metal transfer by this process is much more violent causing the filler material to splatter in such a way as to create a weld that is unsatisfactory in appearance and geometry.

The metal transfer characteristics of the three processes may be summarized as follows:

| Process | Material Transfer |
| --- | --- |
| 1. Spray Arc (long arc) | extra small droplets - no short circuiting |
| 2. Globule (long arc) | large drops - random short circuiting possible |
| 3. Short Circuit (short arc) | small droplets - short circuiting |

Shielding Gases

Argon and helium are used most frequently for the gas metal-arc welding of nonferrous materials. They are completely inert. Although the two gases are equally inert, they differ in their other properties. These differences are reflected in metal transfer through the arc, fusion joint penetrations, weld shape, undercut and other weld variables.

Helium has a higher thermal conductivity than argon. For any given arc length and current, the arc voltage is higher with helium than with argon shielding. Consequently, more heat is produced at any given current with a shield of helium than with one of argon. This makes helium preferable for use in welding thick metals, especially those of high heat conductivity, such as aluminum and copper alloys. Conversely, argon is preferable for use in the welding of the lighter sections of metal and metals of lower heat conductivity, because it produces a lesser amount of heat. This is especially true in welding in other than in the flat position.

Weld reinforcement and penetration patterns differ with argon and helium shielding or mixtures of the two. Welds made with helium have wider reinforcement than welds made with argon. Welds made with argon are more deeply penetrated at the center than at the edges. Helium has been added to argon to increase the joint penetration while retaining the desirable metal transfer characteristic of argon. Bead shape and penetration are greatly influenced by metal transfer characteristics. Spray Arc transfer tends to produce relatively deep penetration along the center line of welds and relatively shallow penetration at the edges because of a plasma jet effect. Globular and short circuiting transfer tends to produce broader and shallower penetration. As a rule, Spray Arc transfer is obtained more readily in argon than helium.

Although the pure inert gases are often essential or preferable for use in welding some nonferrous metals, they do not always provide the most satisfactory operational characteristic for use in welding ferrous metals. There is a tendency with pure argon shielding for the metal to draw away from, or not flow out to the fusion line or toe of the weld in carbon and most low-alloy steels. Furthermore, the metal transfer is erratic and spattery. Use of the helium or argon-helium mixtures fails to improve the situation. Similarly, when welding the more highly alloyed ferrous metals with pure inert-gas shielding, the metal transfer is erratic and spattery.

The addition of a reactive gas such as oxygen or carbon dioxide to argon stabilizes the arc and promotes favorable metal transfer and minimizes spatter. At the same time, such addition changes the shape of the cross section of the weld and promotes the wetting and flow of the weld metal along the edges of the weld in carbon and low-alloy steels. The reactive gas also reduces or eliminates undercut. This change in cross section, a reduction in the central finger of penetration, reduces porosity.

Gases used in shielding with Short Circuit metal transfer often differ from those used in shielding with the drop transfer. For example, argon/carbon dioxide mixtures are frequently used to shield steel with short-circuiting transfer, but are seldom, if ever, used with drop transfer. Argon or argon/helium mixtures are employed for shielding most nonferrous metals. Reactive gases or mixtures of inert and reactive gases are used in the joining of steels.

The polyatomic or "high-voltage" gases are used more frequently in shielding mixtures with short-circuitry welding than in drop transfer welding to increase heat input and improve wetting. The percentage of reactive gas must be restricted to control gas-metal reactions that are harmful metallurgically. Argon/carbon dioxide mixtures perform satisfactorily for shielding stainless steels, but increase the carbon content of the weld metal and reduce corrosion resistance, especially in multipass welds. A less active shielding mixture of 90% helium—7.5% argon—2.5% carbon dioxide has been used to achieve adequate corrosion resistance and reduce oxidation of the weld. In this shielding mixture, both the helium and the carbon dioxide increase the heat input for a given current. The carbon dioxide also improves the arc stability. As a result, better wetting and better weld shape are achieved.

As a further example of the effect of shielding gas mixtures, in the globular transfer process using carbon dioxide as the shield, the transfer is characterized by globules larger (usually twice the size) than the electrode diameter but the droplet transfer is erratic and non-axial. When argon is added to the gas shielding, the argon enriched carbon dioxide gases change the droplets to a smaller size, less than the diameter of the wire, and they are transferred coaxially with the electrode. Gravitational in combination with electromagnetic forces result in the projected material transfer. With additional quantities of argon, the droplet size continues to reduce until the Spray Arc transfer process occurs with an absence of short circuits.

In an article appearing in the January–February 1975 issue of *Metalworking Management*, John Church, the applicant herein, describes the background of the Plasmig Welding Process which he developed in 1971. In the article Mr. Church described the Plasmig process which used the three-gas mixture of argon, carbon dioxide and oxygen and suggested the possibility of adding other gases such as helium or hydrogen which, however, to his knowledge had not been combined as of the time of his article. Prior to Mr. Church's Plasmig process, three-gas mixtures had not been used commercially to weld steel. It remained for applicant to discover his uniquely proportioned four-gas mixture and the unexpectedly improved results which ensued therefrom. By his discovery, applicant has greatly advanced the welding art in respect of weld quality and welding speeds at the same time reducing welding costs.

U.S. Pat. No. 3,139,506 Wolff et al is directed to light arc welding claiming a protective gas mixture having a composition of 20–70% by volume $CO_2$, 1–15% $O_2$ with the remainder Ar. In the last sentence of their specification, Wolff et al suggest that helium or a mixture of helium and argon may be used instead of argon in their protective gas mixture. The patent is silent as to mixture percentages of helium and argon and thus no critical ranges established. It is also to be noted that Wolff et al disclose volume ranges for $CO_2$ and $O_2$ far beyond those utilized by applicant.

DISCLOSURE OF THE INVENTION

The purpose of the present invention is to substantially increase weld deposition rates while improving the desired weld quality and appearance. The present invention achieves this desired result through a new electric arc Gas Metal Welding system which includes substantially higher current densities, voltages, electrode diameters combined with a unique welding gas which produces a unique welding plasma having greatly improved stability. While improving weld joint physical properties, this new process also achieves weld deposition rates on the order of two times the conventional Spray Arc process.

The process of the present invention has the desired characteristics of both the Spray Arc (large numbers of globules per second) and Globular transfer (large size globules) processes without any short circuiting phenomena. In other words, the process achieves the enlarged globules like the Globular transfer process with the steady globule stream of the Spray Arc process. The high deposition rate is unexpected since the Globular (large drops) transfer of electrode material has heretofore been associated with low current density welding. Further, a consistent coaxial release of the globules is achieved as opposed to the laterally offset release as realized with prior type shielding gas mixtures. It is believed that the axial globule release contributes to the non-spattering results of the subject process. A most important aspect of the new process is the recognition of the importance of stabilizing the size and form of the plasma and the creation of a welding gas mixture which facilitates this result and enables the use of higher current densities and larger electrode sizes.

A welding process which involves regular or intermittent short circuiting between the electrode and the workpiece inevitably slows or reduces the weld deposition rate due to the interruption of current flow and, hence, the rate of metal transfer from the electrode to the workpiece. Deposition of the weld material and quality of the weld joint are directly related to the quantity of metal transferred from the electrode, the preheated condition of the workpiece joint, and the ability to contain the molten transferred metal stream in the weld joint. Put in other terms, while it is known that high current densities and voltages increase electrode metal transfer, other conditions determine the ability to retain such transferred metal on the workpiece so as to create a desired weld joint, and, normally, have kept current densities to the 130,000 amperes/square inch range for the heretofore fastest deposition processes.

In the welding process of the subject invention there is a free flight and non-short circuiting stream of molten electrode material, as in Spray Arc transfer, combined with globule sizes normally associated with the Globular transfer process to yield a substantially increased transfer volume of electrode weld material. At the same time, the new welding gas mixture and its unique and controlled plasma field enables the retention of such increased metal stream volume in the weld joint, improves joint quality and penetration through greatly enhanced preheating of the substrate.

The unique welding gas mixture utilized with my invention consists essentially of 3% to 10% by volume of carbon dioxide, from 0.1% to 1% by volume oxygen and the remainder helium and argon in a ratio of from 0.5 to 3.5 parts by volume argon for each 1 part by volume of helium.

The invention will be more clearly understood by a perusal of the ensuing detailed description and illustrative drawings.

BEST MODE FOR CARRYING OUT THE INVENTION

Figure 1:
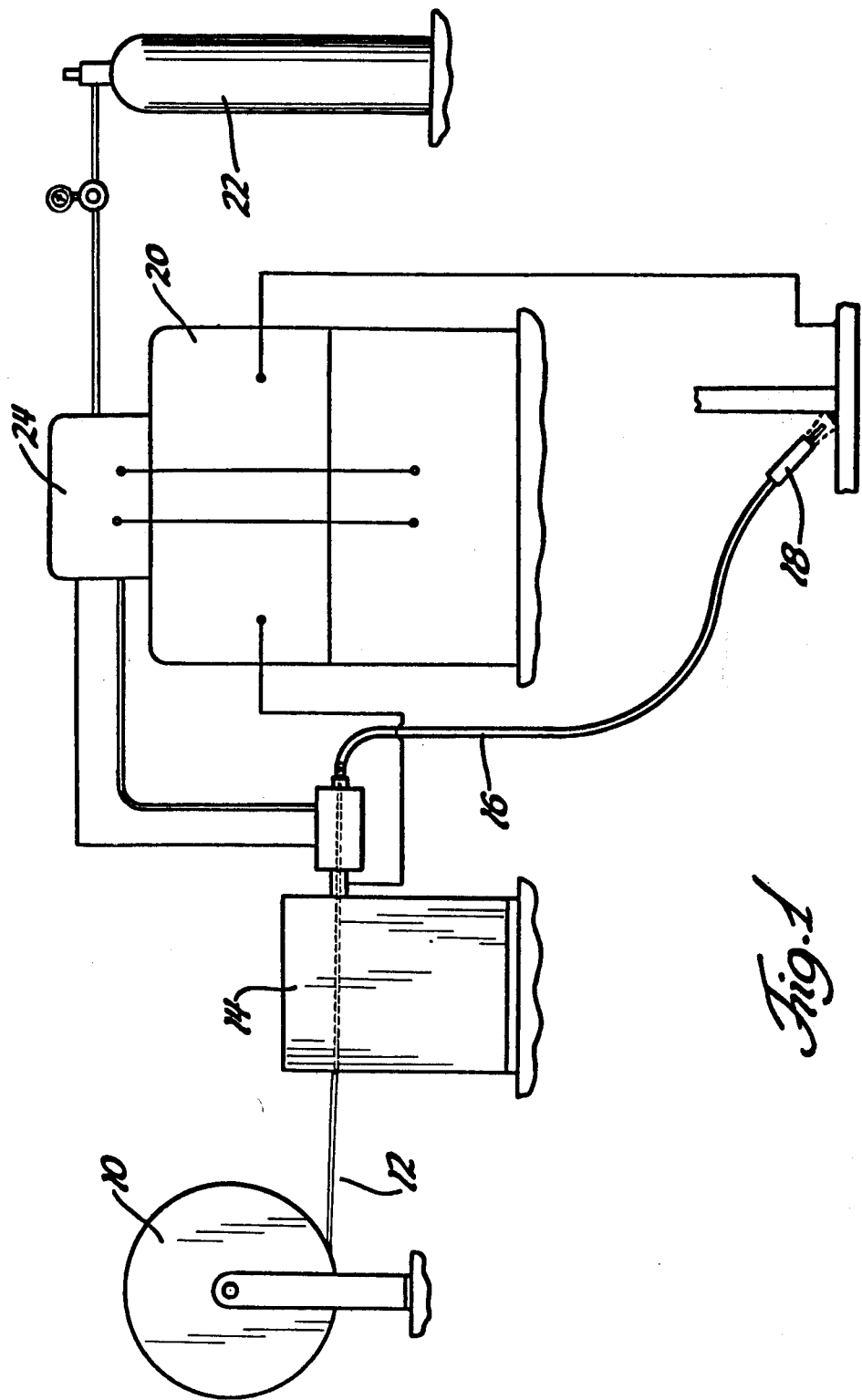
FIG. 1 is a schematic view of a Gas Metal-Arc welding system.

A schematic representation of a typical Gas Metal-Arc welding system is shown in FIG. 1. A reel 10 supplies welding wire 12 to a wire feed device 14 which pushes the wire through a flexible conduit 16 and the latter which terminates in an electrode holder or welding gun 18. A power supply 20 supplies current to the welding wire and includes normal voltage and amperage controls. A shielding gas tank 22 supplies gas to a flow control device 24 which, in turn, feeds the gas to conduit 16 and the welding gun 18.

Figure 2:
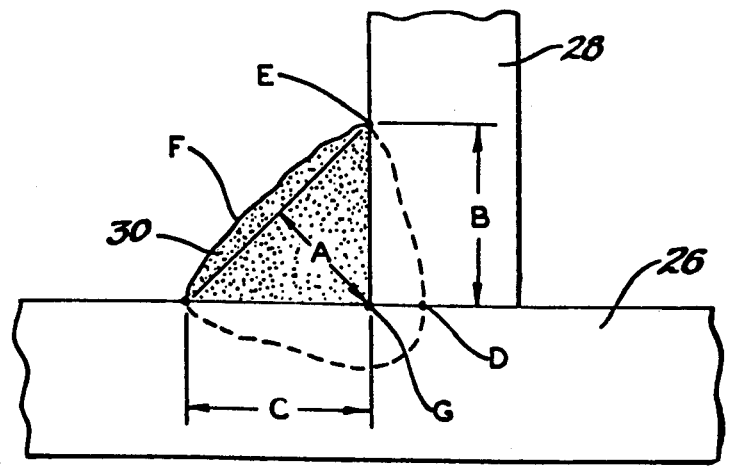
FIG. 2 is a view of a theoretical weld joint achieved by the subject invention.

A schematic weld joint of the type generally achievable with the present invention is shown in FIG. 2 and includes a horizontal plate 26, a vertical plate 28, and weld material 30. The following designations apply to the weld joint of FIG. 2:

A. Theoretical throat
B. Vertical leg
C. Horizontal leg
D. Root of weld
E. Toe of weld
F. Face of weld
G. Root of joint The weld of the subject invention is designed to produce legs B and C of comparable lengths and a flat to slightly convex face F. Typically with heretofore known high current density and high deposition rate processes, legs of considerably unequal sizes are often produced with the longer leg being on the horizontal surface and the shorter leg being on the vertical surface. Furthermore, the weld face profiles have not been consistent, the toe of the weld often does not blend smoothly into the plates and there is frequent undercutting of the vertical plate around the toe E.

Figure 3A:
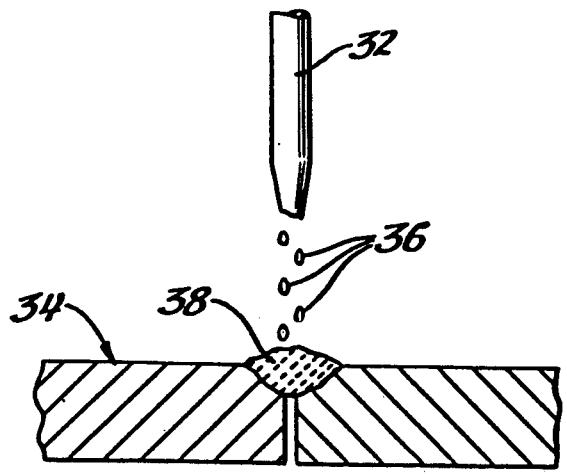
FIG. 3 represents schematic presentations of three basic types of Gas Metal-Arc transfer processes.
Figure 3B:
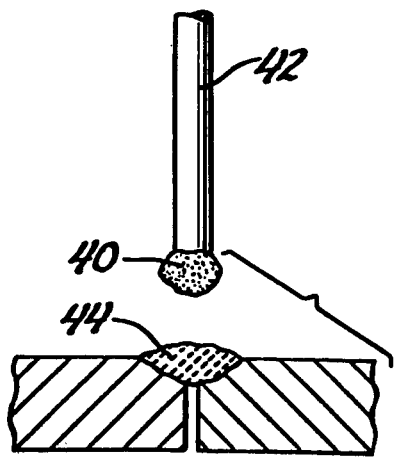
Figure 3C:
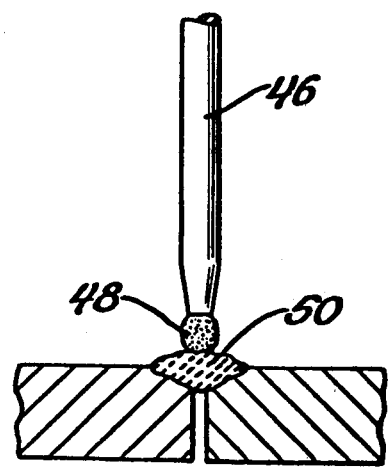

FIG. 3 shows schematic presentations of typical Spray Arc (A), Globular (B) and Short Circuit (C) transfer processes. Referring first to the Spray Arc (A), an electrode 32 is vertically spaced from the substrate or workpiece 34 and includes a series of discrete small droplets 36 which flow in the arc stream to the weld puddle 38. In the Globular transfer (B), a large globule 40 forms at the end of the electrode 42 and, when the gravitational pull on the globule exceeds the surface tension between the electrode and the globule, the latter falls to the weld puddle 44. In the Short Circuit transfer (C), the tip of electrode 46 melts and forms a drop 48 which elongates under gravity until it contacts the weld puddle 50 creating a short circuit followed by breaking the bridge between the drop and electrode causing the arc to resume and drop-forming cycle to begin again.

Inasmuch as the Spray Arc process occurs at relatively high current densities, however, normally not exceeding 130,000 amperes/square inch, this process has a relatively high deposition rate, e.g. 0.12 to 0.30 pounds per minute. The Globular and Short Circuit transfers occur with lower current densities and slower deposition rates.

Figure 4:
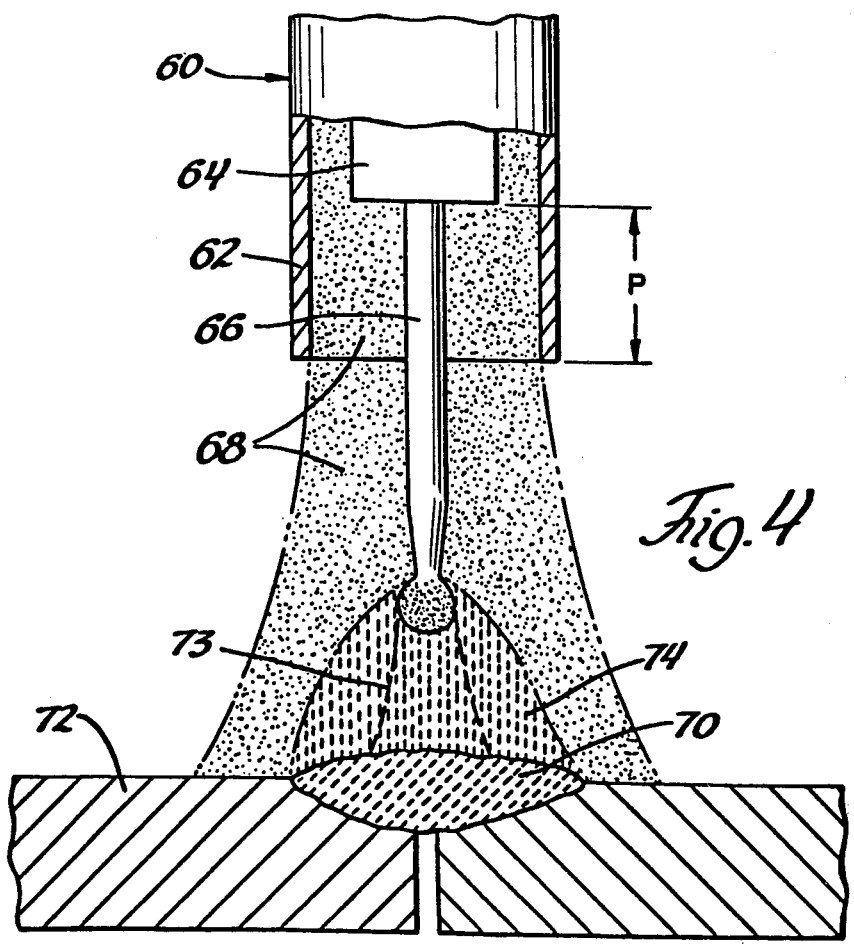
FIG. 4 is a schematic view of the gas welding system as practiced by the subject invention.

FIG. 4 is a schematic view of a portion of a welding gun indicated generally at 60, and depicting the metal transfer process of the subject invention. The welding gun nozzle 62 coaxially surrounds tip 64 through which the welding wire or electrode 66 is fed. Current from the power source is introduced to electrode 66 at tip 64 and the electrode is pre-heated through the distance P between the end of the tip and the end of the nozzle. Shielding gas 68 flows through nozzle 62 and surrounds the electrode and the molten puddle 70 in workpiece 72. The welding arc is indicated at 73.

The electrode current raises the energy level of the welding gas sufficiently to ionize at least the inner layer to create a plasma jet 74 around the electrode between the nozzle and the workpiece and encompassing the weld puddle 70.

Since ionized gas or plasma does not follow the known laws of physics and thermodynamics, it has been termed a "fourth state of matter", to wit, solid, liquid, gaseous and plasma. Plasma has two primary advantages over ordinary gas for heating purposes: higher temperature and better heat transfer to other objects. It is obvious that in welding it is highly desirable to heat the filler material quickly which can be greatly facilitated by certain plasmas. It has also been learned in the present invention that a controlled or stabilized plasma greatly facilitates pre-heating of the substrate thereby improving weld penetration.

In creating a plasma, the gas atoms are disassociated into ions and free electrons raising the charged gas particles to very high temperatures, e.g. 12,000° to 40,000° F. When such highly heated gas particles transfer across the arc, the charged plasma particles give up their heat to melt the electrode and pre-heat the substrate after which the cooled gas particles recombine to form the molecular structure of the original gas or gases.

While some plasma is believed to be created with most shielding gases used in arc welding, each such gas or mixture of gases has a unique plasma with distinct physical and electrical characteristics. In common, the heat of the plasma, e.g. 74 of FIG. 4, combines with the heat generated by the electrode arc to provide a total heat available to melt the electrode. However, heretofore there appears to have been no recognition of the importance of controlling or stabilizing the shape and size of such plasma as a means for improving weld quality and weld deposition rate. Subsequently, more will be said regarding the plasma of the subject invention.

It is part of the discovery of the subject invention that it is necessary to control the electrical potential between the welding arc and the plasma in order to achieve a controlled and coaxial transfer of the molten electrode particles or drops to the workpiece without blowing out or spattering the filler material and without undercutting of the workpiece while, at the same time, allowing the transfer of increased quantities of the electrode filler material to the weld joint.

Current exists in both the welding arc and in the plasma surrounding the electrode. These currents combine to produce the total heat available to melt the electrode and to pre-heat the workpiece. The plasma potential is the difference between the arc voltage and the plasma voltage. If the potential difference is relatively large, as is the case with the plasma produced in the typical Spray Arc process with an argon or argon-rich shielding gas, the plasma force has the tendency to wash out or blow out the deposit of weld metal at high current densities which requires reducing currents, thus reducing deposition rates, in order to maintain a satisfactory weld joint.

In the welding process of the present invention, a unique plasma jet or shroud is created wherein the plasma potential (the difference between arc and plasma voltages) is lower than with known Spray Arc processes which permits higher current densities enabling greatly increased transfers of electrode material to the weld joint without washing out or spattering the weld deposit.

Heretofore, in GMA welding it has not been generally practical to use electrodes having diameters greater than 1/16 of an inch due to limitations on the amount of current which can be used while still maintaining the desired weld joint formation. Such current has heretofore been limited to the 100-400 ampere range or current densities not in excess of the 130,000 amperes/square inch range.

In the subject invention, the unique welding gas allows the use of current in ranges to 1100 amperes, current densities in ranges to 450,000 amperes per square inch and electrodes up to 5/32 inch in diameter. At the same time the mixture permits smaller diameter wires to carry higher current densities, e.g. 0.030" wire can carry 360,000 amperes/square inch compared to a normal 120,000 amperes/square inch. Flow of welding gas is in the range of 35 to 70 c.f.h.

In order to create the unique plasma of the subject invention, applicant's novel welding gas is a mixture of argon, helium, oxygen and carbon dioxide in the following mixture ranges:

| | |
|---|---|
| Argon | 40% to 70% |
| Helium | 25% to 60% |
| Carbon dioxide | 3% to 10% |
| Oxygen | 0.1% to 1% |

As will be hereinafter set forth, specific gas mixtures as well as amperages and voltage levels are varied with the metals or metal alloys being welded and the size of the weldment desired.

Mild And Low Alloy Steels

Figure 5:
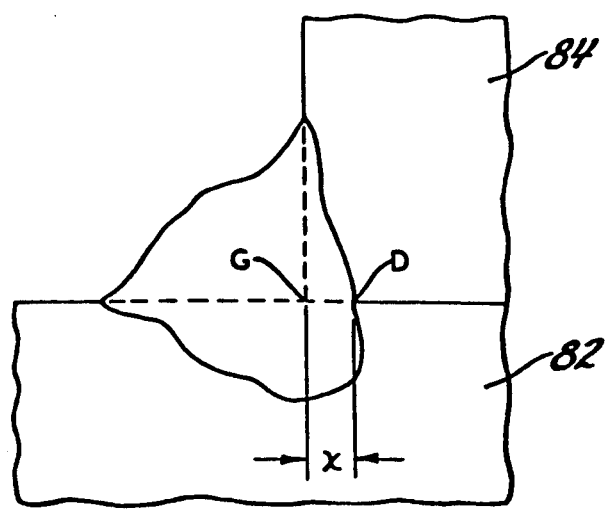
FIGS. 5–13 are views of weld joints formed with different shielding gases as compared with the welding gas of the subject invention.
Figure 6:
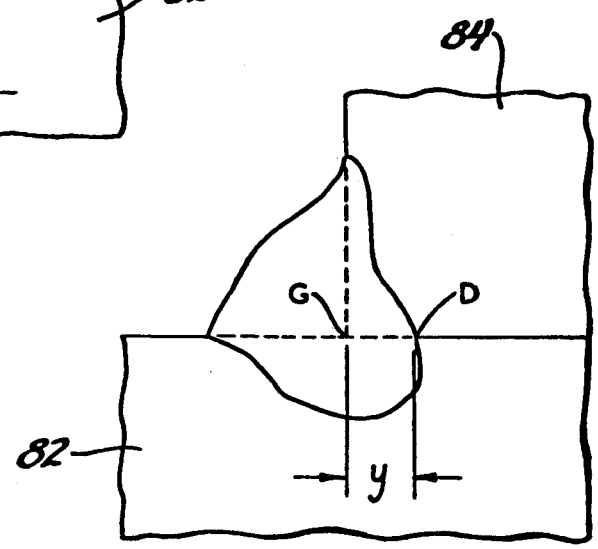
Figure 7:
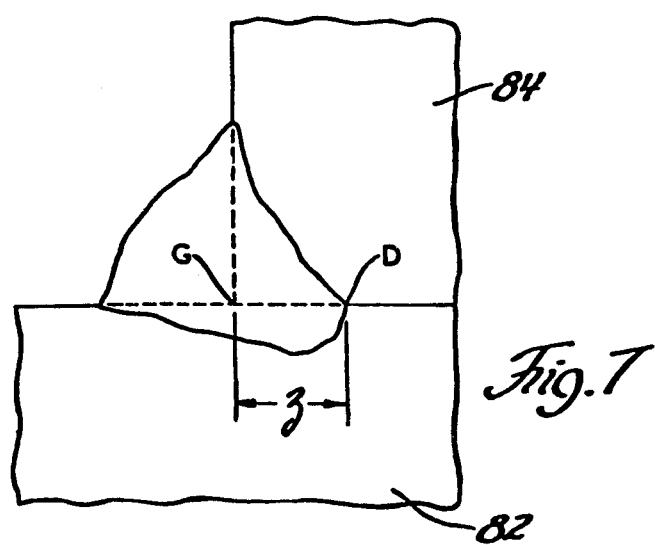

As noted, heretofore the fastest weld deposition rates have been achieved with the Spray Arc transfer process. Depending on the weld penetration desired, such process has normally involved a shielding gas comprised of argon and carbon dioxide or argon and oxygen alone. Weld joints achieved with such shielding gases as compared with the welding mixture of the subject invention are illustrated in FIGS. 5-13. In order to achieve a reasonable comparison, basically identical welding conditions were established with the primary variants being the shielding gas or gas mixture employed. The comparative tests involved the use of 20 mm (0.8 in.) gauge, low carbon, mild steel plates 82 and 84 horizontally and vertically related to form a T-joint. The welding electrodes were E 70 S6 and E 70 S7 steel wire of 0.052 in. diameter. The electrodes used were either copper coated or uncoated and gave no difference in welding results. A first standard for quality of a weld is the depth of weld penetration from the root of the weld joint G to the root of the weld D. The weld penetration comparisons are illustrated in FIGS. 5-7.

Referring first to FIG. 5, a Spray Arc weld joint is shown using what has heretofore been considered a most effective shielding gas mixture of 85% argon and 15% carbon dioxide. The weld penetration designated at x measures 2.5 mm (0.10 in.) into the vertical plate from the root of the weld joint G to the root of the weld D.

The welding parameters and results for the weld joint shown in FIG. 5 are as follows:

| | |
|---|---|
| Shielding gas | 85% argon/15% carbon dioxide |
| Wire speed feed | 535 in./min. |
| Melt-off rate | 19 lbs./hr. |
| Current | 410 amperes |
| Voltage | 33 volts |
| Welding speed | 19.7 in./min. |

It is known that the use of a carbon dioxide shield improves weld penetration. Accordingly, FIG. 6 shows a weld joint using a 100% carbon dioxide shielding gas. In this case the weld penetration y is increased to 3.4 mm (0.13 in.).

The welding parameters and results for the weld joint shown in FIG. 6 are as follows:

| | |
|---|---|
| Shielding gas | 100% carbon dioxide |
| Wire speed feed | 484 in./min. |

| | |
|---|---|
| Melt-off rate | 18 lbs./hr. |
| Current | 350 amperes |
| Voltage | 33 volts |
| Welding speed | 19.7 in./min. |

FIG. 7 shows the weld joint using the most preferred welding gas mixture of the subject invention for mild and low alloy steels. In this case the weld penetration z is 5.4 mm (0.21 in.). The welding parameters and results for the weld joint of FIG. 7 are as follows:

| | |
|---|---|
| Shielding gas | 65.0% argon; |
| | 26.5% helium; |
| | 8.0% carbon dioxide; |
| | 0.5% oxygen |
| Wire speed feed | 630 in./min. |
| Melt-off rate | 22 lbs./hr. |
| Current | 400 amperes |
| Voltage | 37.5 volts |
| Welding speed | 31.5 in./min. |

It has been found that varying each of the individual mixture gases immediately above in the range of plus or minus 5% of the most preferred values provides essentially the same greatly improved results.

Comparing the results of the welding processes of FIGS. 5 and 6, by conventional Spray Arc processes, with that of the welding process of the subject invention, FIG. 7, it is to be noted: the weld penetration of the subject process is 216% better than that of FIG. 5 and 159% better than that of FIG. 6. The welding speed and thus deposition rate of the processes of FIGS. 5 and 6 were both 19.7 in./min. as compared to 31.5 in./min. of the subject invention. In other words, the weld deposition speed of the subject invention is 160% faster than comparable Spray Arc processes using comparable amperes and voltages.

Thus, the welding process of the subject invention achieves better weld penetration and deposition rates than with the heretofore best known Spray Arc processes.

A further standard for measuring the quality of a weld joint is to compare the hardness (Rockwell B) of the weld filler material with that of the substrate or workpiece. Ideally, a weld joint would be best if the hardness of the deposited weld filler material and the substrate or workpiece around the weld joint were the same. However, heretofore it has been accepted that the deposition filler material is normally harder than the workpiece.

However, in measuring the hardness of the deposited filler materials and workpieces in accordance with the Spray Arc welding processes of FIGS. 5 and 6 with that of the subject process of FIG. 7, it is to be seen that the hardness of the deposited filler material of the subject process is essentially the same as that of the workpiece. These results are depicted in FIGS. 8-10.

Figure 8:
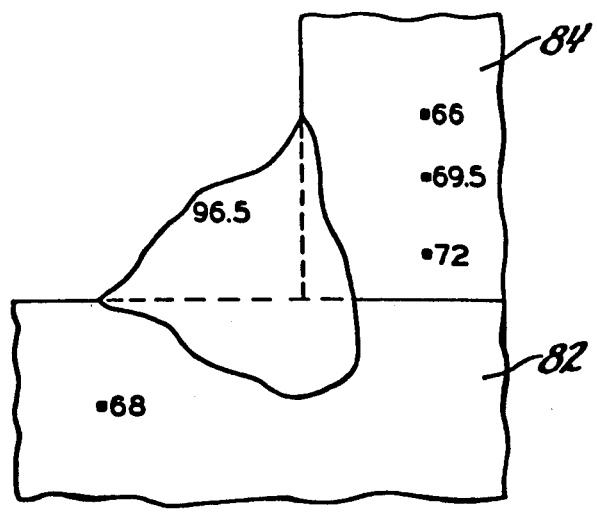
Figure 9:
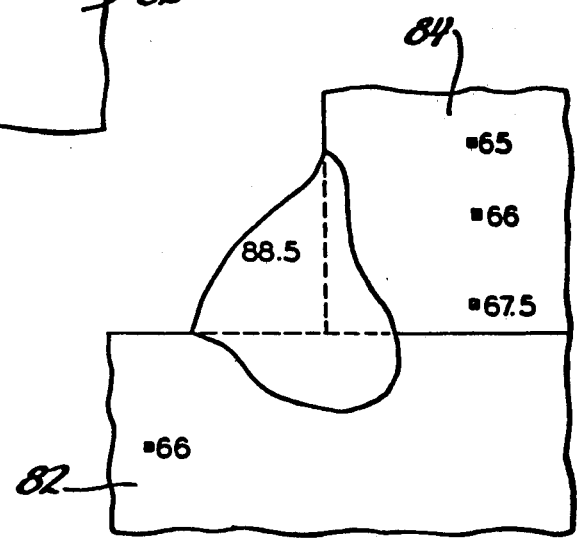
Figure 10:
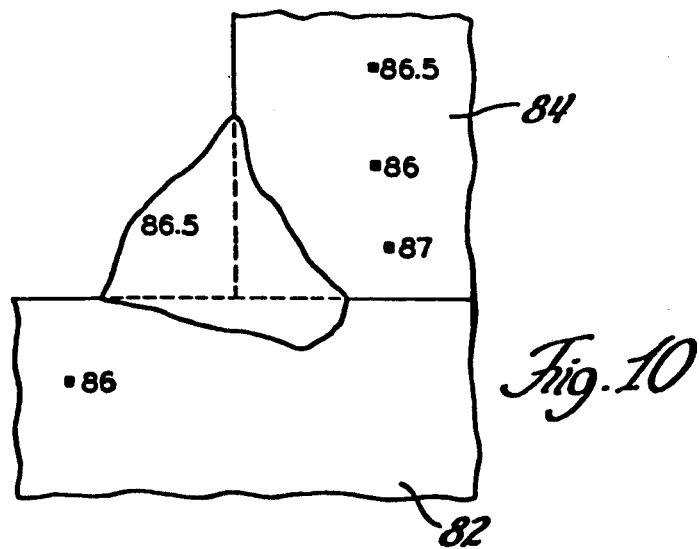

In FIGS. 8-10 the numbers on the drawings shown depict the Rockwell hardness numbers (using a 225 lb. weight) taken at various points on the workpiece around the weld joint and on deposited filler material.

FIG. 8 corresponds to the weld joint of FIG. 5 using the shielding gas of 85% argon and 15% carbon dioxide. In this case the hardness of the workpiece around the weld joint varies from 66 to 72 and the hardness of the deposited filler material is approximately 96. Thus, the filler material is from 146% to 134% harder than the workpiece.

FIG. 9 corresponds to the weld joint of FIG. 6 using the shielding gas of 100% carbon dioxide. Here the hardness of the workpiece around the joint varies from 65 to approximately 67 and the hardness of the filler material is approximately 88. Thus, the filler material is from 135% to 131% harder than the workpiece.

FIG. 10 corresponds to the weld joint of FIG. 7 using the welding gas of the subject invention. In this case, the hardness of the workpiece around the weld joint varies from 86 to 87 and the hardness of the filler material is approximately 86. Thus, the hardness of the filler material is essentially the same as that of the workpiece.

Figure 11:
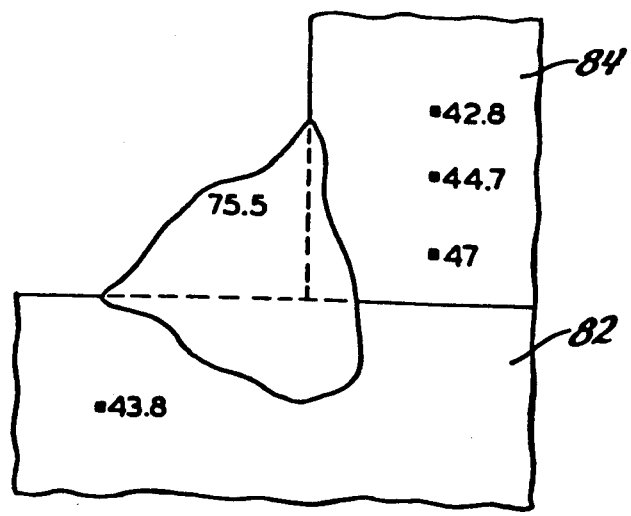
Figure 12:
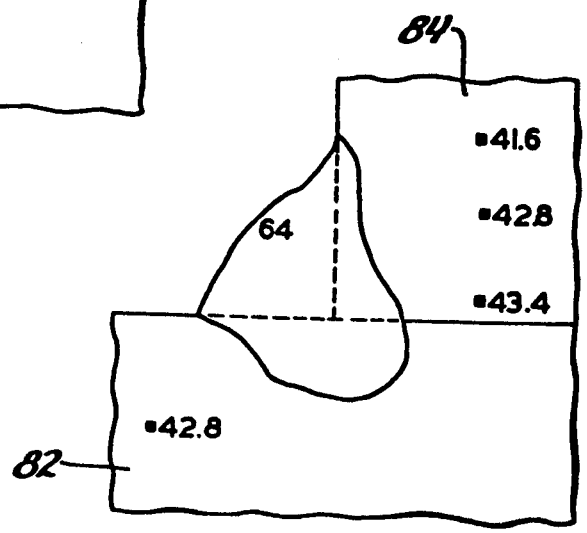
Figure 13:
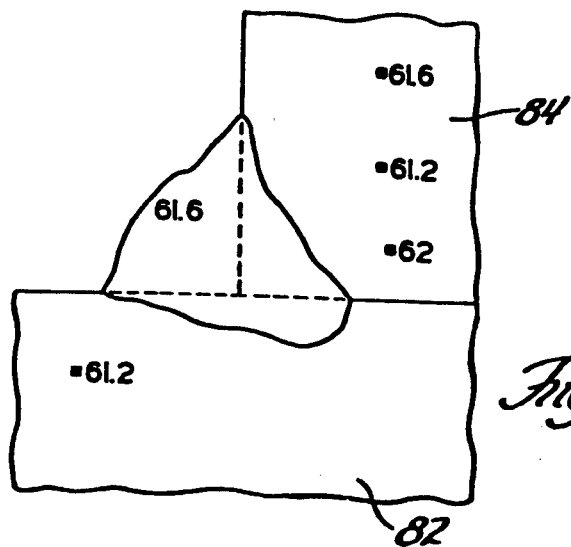

As a further test for the quality of a welded joint, it is most desirable that the tensile strength of the workpiece and the deposited filler material be as nearly equal as possible. Such comparative tensile strengths are depicted in FIGS. 11-13. The numbers shown in FIGS. 11-13 represent tensile strength measured in $Kg/mm^2$.

FIG. 11 corresponds to the weld joint of FIG. 5 using the shielding gas of 85% argon and 15% carbon dioxide. Here the workpiece tensile strength varies from approximately 43 to 47 while that of the filler material is approximately 75. Thus, tensile strength of the filler material is approximately 172% greater than that of the workpiece.

FIG. 12 corresponds to the weld joint of FIG. 6 using a 100% carbon dioxide shielding gas. Here the tensile strength of the workpiece is approximately 43 and that of the filler material 64. Thus, the tensile strength of the filler material is approximately 149% greater than that of the workpiece.

FIG. 13 corresponds to the weld joint of FIG. 7 utilizing the welding gas of the subject invention. In this case, the tensile strength of the workpiece and that of the filler material are approximately equal at 61.

Another standard industry test is known as the Charpy Impact Test. The test determines the ability of a weld to withstand a predetermined impact at a given temperature. For comparison purposes, reference is made to *Pocket Welding Guide* produced by Hobart Brothers Company and copyrighted in 1979. Referring to page 74, Charpy test results for an AWS E70S-6 electrode material and using a $CO_2$ shielding gas indicates at $-20°$ F. impact of 22 foot pounds for 0.045 in. wire. As conducted by an independent testing organization, comparable tests using E70S-6 electrode material and the mild and low alloy steel welding gas mixture, supra, of the present invention at $-20°$ F. give the following range of results using five test samples:

| Sample | Impact Ft. Lb. |
|---|---|
| 1 | 120.0 |
| 2 | 85.0 |
| 3 | 104.0 |
| 4 | 75.0 |
| 5 | 83.0 |

As is the procedure, the high (120.0) and low (75.0) results were discarded giving an average impact of approximately 90 ft. lb. or three to four times as great as that shown in the Hobart *Guide*.

In an effort to determine the reason for the unexpectedly superior impact test results, the same testing organization conducted various additional examinations of the weld and including a photomicrograph of a sulphur print which indicated that the weld was virtually sulphur free. It was thus concluded that greatly improved impact results were due to the cleanliness or sulphur free condition of the weld achieved by applicant's process and gas mixture. With applicant's process, the weld puddle or cauldron is raised to a higher temperature and pulsed or bombarded, infra, at an unusually high rate by the large electrode globules to help purify or clean the weld joint.

It is theorized that the close matching of weld filler material and weld joint hardnesses, tensile strengths, the improved penetration and greatly improved impact strengths of the weld achieved by the present invention is due to the greatly improved mixing or alloying of the filler and substrate materials occasioned by the substantially higher heats, including substrate pre-heating, available with applicant's process. Such results are also believed due to the rapid bombardment of the weld joint by large quantities of enlarged molten globules and the sulphur free content of the weld.

Thus, it is apparent that the weld system of the subject invention provides a weld joint that is substantially better with respect to weld impact strength, weld penetration, weld deposition rate as well as matching deposited filler material and workpiece with respect to hardness and tensile strength.

Low Alloy, Quenched And Tempered Steel

Another important category of steels the welding results for which are greatly improved by applicant's invention are those of the low alloy, quenched and tempered types. Applicant's most preferred welding gas mixture for this category is as follows:

| | |
|---|---|
| Argon | 44.00% |
| Helium | 52.00% |
| Carbon Dioxide | 3.82% |
| Oxygen | 0.18% |

Using the above welding gas mixture to butt weld a pair of 5¾" thick sections of low alloy quenched and tempered steel, Charpy Impact Tests were conducted at −60° F. on five 10 mm sections taken from each of the upper (Side A) and lower (Side B) portions of the weld joint and gave the following results:

| Side A | | Side B | |
|---|---|---|---|
| 1. | 68 ft. lbs. | 1. | 103 ft. lbs. |
| 2. | 81 ft. lbs. | 2. | 101 ft. lbs. |
| 3. | 102 ft. lbs. | 3. | 97.5 ft. lbs. |
| 4. | 93 ft. lbs. | 4. | 62 ft. lbs. |
| 5. | 103 ft. lbs. | 5. | 63.5 ft. lbs. |

Again eliminating the high and low results, the average impact values were 92 ft. lbs. for Side A and 86 ft. lbs. for Side B. These results were approximately two times better than the highest standards ever set for the impact strength for welding such materials.

Stainless Steel

For stainless steel, applicant's most preferred welding gas mixture is as follows:

| | |
|---|---|
| Argon | 41.66% |
| Helium | 55.00% |
| Carbon dioxide | 3.20% |
| Oxygen | 0.14% |

Plasma

Prior to the present invention little, if any, attention has been paid to the character, e.g. shape, size and consistency, of the plasma formed during GMA welding. It is the uniqueness of applicant's plasma which has facilitated the improved welding achieved by the subject invention. Heretofore, gases have been selected primarily with the view of protecting the weld joint from contamination (see U.S. Pat. No. 3,496,323 Lesnewich et al), varying weld penetration (see U.S. Pat. No. 3,139,506 Wolff et al), and arc stabilization (see U.S. Pat. No. 2,916,601 Lesnewich), all of which are important welding considerations. However, any shielding gas plasma created has been incidental to these formerly noted considerations. As subsequently will be shown and described using previously known and preferred gas mixtures, the resultant plasmas have been irregular or uncontrolled as to shape and, at times, even disappear during the welding process.

Applicant has discovered the criticality of controlling and stabilizing the plasma in order to improve both weld quality and weld deposition rates. Thus, the primary purpose of the subject invention is to control the shape, size and consistency of the plasma which surrounds the electrode and the weld puddle or weld joint. By controlling the plasma shape and size and, further, closely confining the plasma to the electrode and weld area, the plasma heat is concentrated so as to both rapidly melt the electrode material and pre-heat the weld area to thereby enhance weld penetration, weld deposition rate and weld quality.

In order to demonstrate its uniqueness, a series of high-speed (4,000 frames per second) motion picture films were made comparing applicant's plasma with those of two other highly regarded shielding gases. Specifically, the other two shielding gases were (1) the mixture of 85% argon and 15% carbon dioxide and (2) 100% carbon dioxide. The weld deposition rates and weld qualities using these shielding gases have been compared and described with reference to FIGS. 5-13.

Since it is difficult to reproduce frames of such high-speed films in patent drawings, representations or depiction of comparative frames or pictures are presented in FIGS. 14-22. Each of the FIGS. 14-22 represents a photograph taken at 1/4000 of a second.

In the case of plasma generated by adding argon during an arc welding process, and as clearly shown in the high-speed motion picture studies, the shape, dimensions and, most importantly, the direction of the shielding gas plasma continuously change to some degree during the welding cycle. In other words, while the plasma depicted at 74 of FIG. 4 is an instantaneous representation of applicant's plasma, at another instant the proportions of the plasma will vary. However, as will be seen in comparing FIGS. 14-22, the plasmas of various shielding gases overall have different physical and electrical characteristics which result in greatly different weld characteristics.

In the high-speed film studies depicted in FIGS. 14-22, the electrode sizes were 0.052 in., voltages in the range of 33 to 38 volts and amperages in the range of 350 to 410 amperes. Incidentally, the electrode size, voltages and amperes were generally the maximums practically useable with the comparative shielding gases, i.e. argon/carbon dioxide and carbon dioxide alone.

Figure 14:
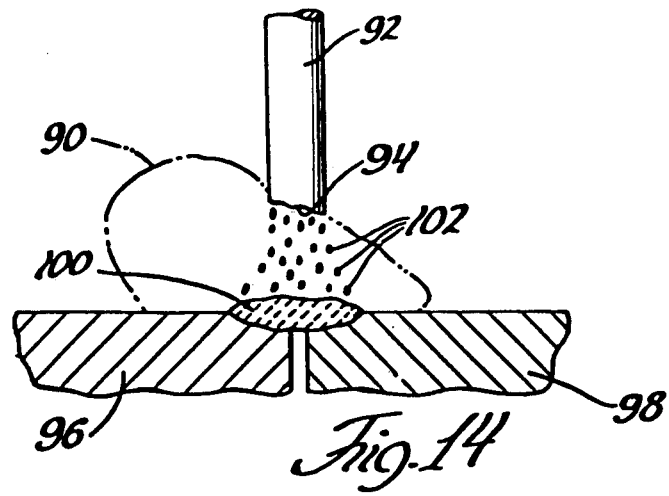
FIGS. 14–16 are representations of frames from a high-speed photographic film depicting the plasma developed utilizing a shielding gas comprised of 85% argon and 15% carbon dioxide.
Figure 15:
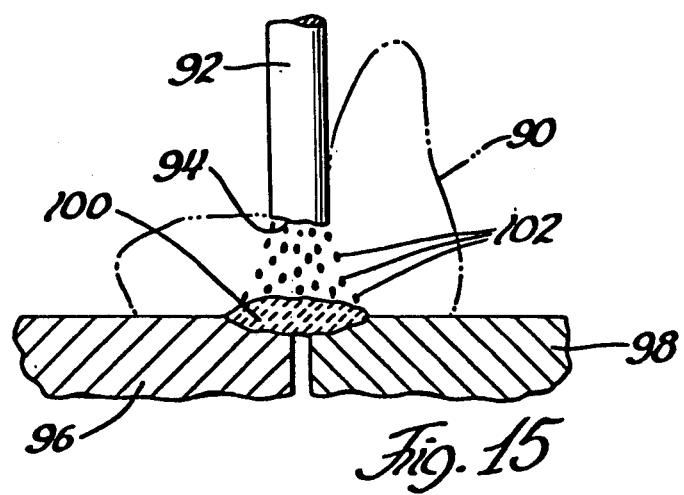
Figure 16:
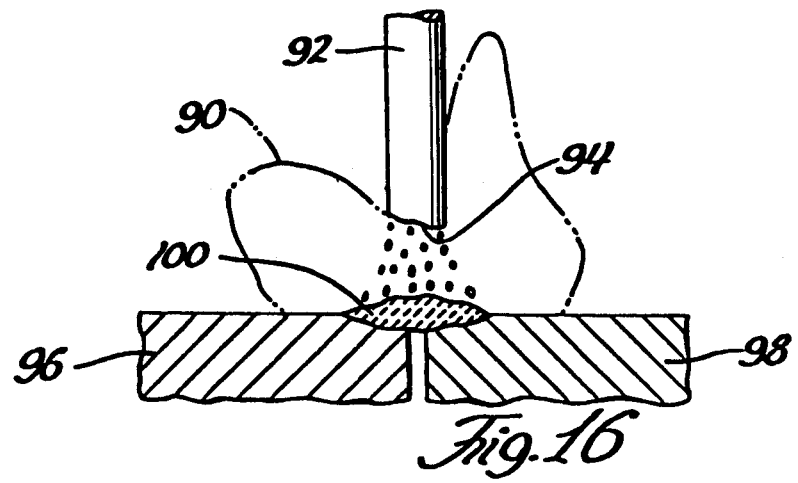

In the first high-speed motion picture film, individual frames of which are depicted in FIGS. 14–16, the shielding gas comprised 85% argon and 15% carbon dioxide. In this case, it was observed that the plasma 90 does not closely surround the electrode 92 above the tip 94 but rather appears to begin at the tip and engulfs the fine molten droplets falling from the tip. It is to be noted that the fine molten droplets are each substantially smaller than the electrode diameter. The plasma 90 strikes the substrate plates 96 and 98 and, as seen in FIGS. 14–16, rises in an uncontrolled or random pattern from a base width w of approximately 0.2 to 0.4 inch around the weld puddle 100 and extends to a general height h of about 0.4 inch. Unless the current density is kept below a given value, generally not exceeding 130,000 amps/in.$^2$, the erratic or uncontrolled nature of plasma 90 tends to wash the molten metal from the weld puddle 100. The potential difference between the electrode arc and the plasma apparently does not allow the two to effectively combine their heat energies to maximize the electrode melt and substrate pre-heat effects. The film also shows that the size of droplets 102 from the end of the electrode results in a fine spray which does not leave the electrode in a regular pattern. Rather, the droplets randomly separate from one side of the electrode tip and then the other. Due to the uncontrolled nature of plasma 90 and the irregular departure of the droplets from the electrode, it is necessary to limit current density to reduce the tendency of the molten metal to wash out of the weld puddle.

For welding deposition rate comparison purposes, the parameters of the first film (85% argon/15% carbon dioxide) are:

| Wire speed | 540"/min. |
|---|---|
| Melt-off rate | 17 lbs./hr. |
| Welding speed | 19"/min. |

Figure 17:
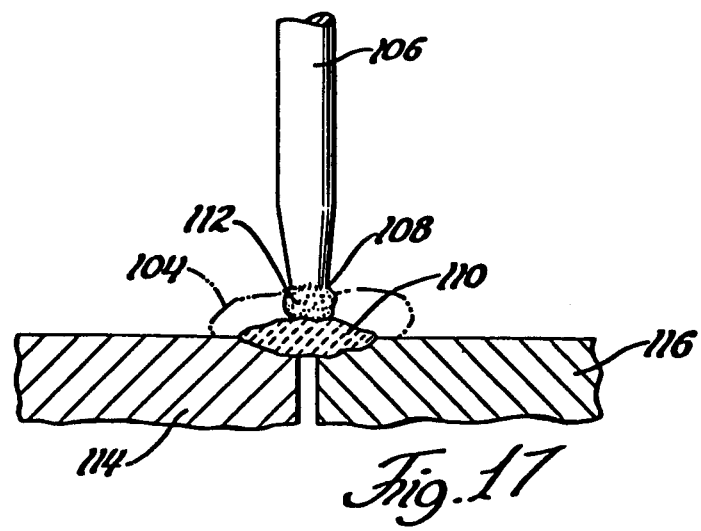
FIGS. 17–19 are representations of frames from a high-speed photographic film depicting the plasma developed utilizing a shielding gas of 100% carbon dioxide.
Figure 18:
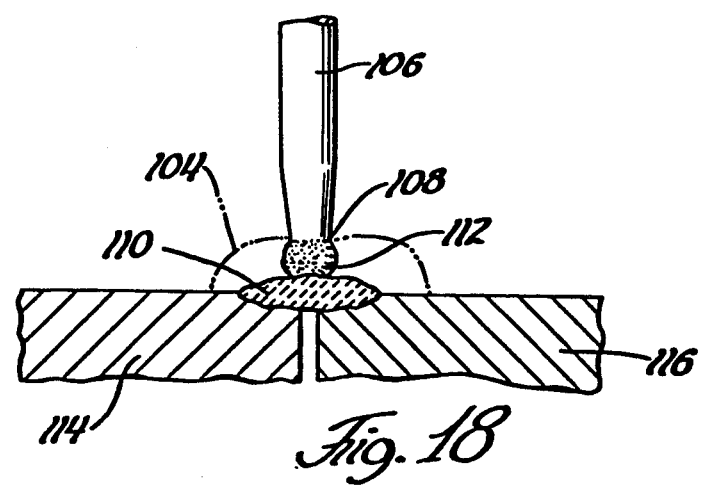
Figure 19:
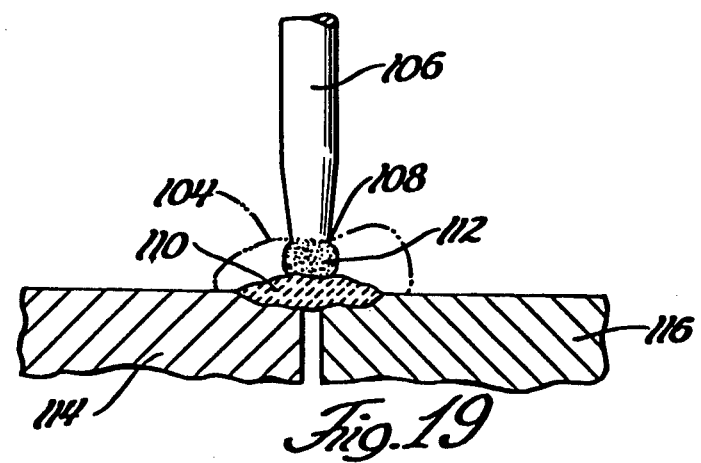

In the second high-speed motion picture film, individual frames of which are depicted in FIGS. 17–19, the shielding gas is comprised of 100% carbon dioxide. Again, the plasma 104 does not surround the electrode 106 very much above the tip 108 but rather, extends generally between the tip and the weld puddle 110 and has a very narrow width of approximately 0.08 to 0.12 inch around the weld puddle and a height of about 0.1 inch. During this welding process, it was observed that the plasma appears periodically to disappear or be extinguished. It is also to be noted that the total plasma is quite small. An oscillograph trace overlaid on the film confirms erratic arc behavior due to the short-circuiting which occurs as the electrode drop 112 elongates to touch the work piece 114–116 and enter the weld puddle.

The welding deposition rate parameters of the second film (100% carbon dioxide) are:

| Wire speed | 500/min. |
|---|---|
| Melt-off rate | 16 lbs./hr. |
| Welding speed | 19"/min. |

Figure 20:
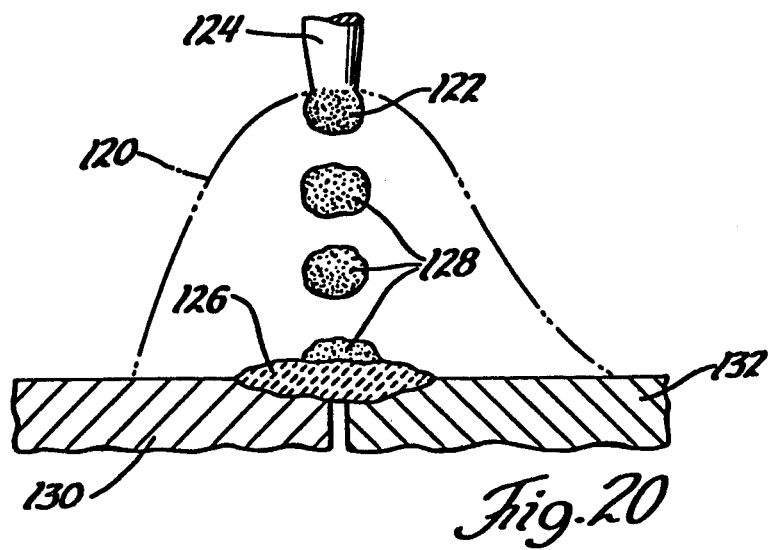
FIGS. 20–22 are representations of frames from a high-speed photographic film depicting the plasma developed utilizing applicant's unique welding gas mixture.
Figure 21:
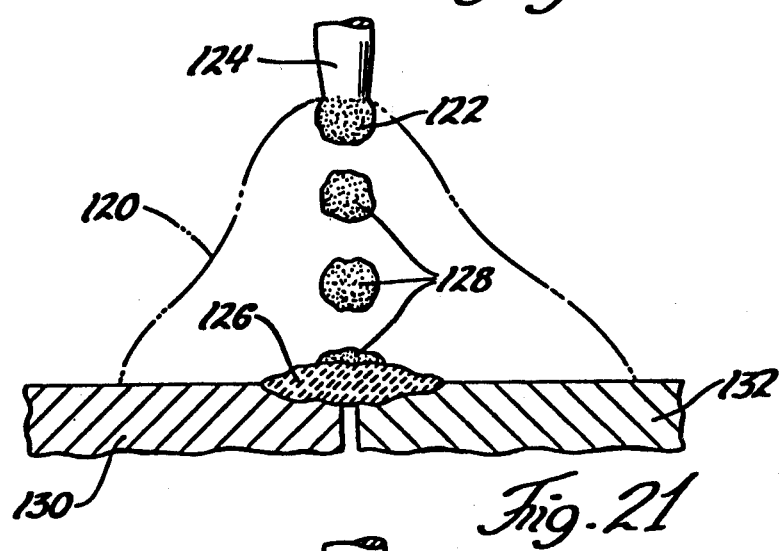
Figure 22:
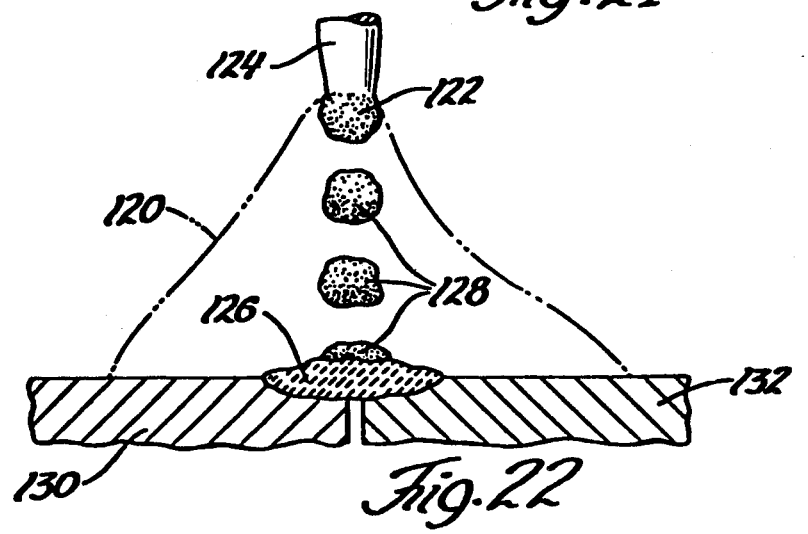

In the third high-speed motion picture film, individual frames of which are depicted in FIGS. 20–22, the welding gas is comprised of applicant's mixture of 65–70% argon, 25–35% helium, 5–10% carbon dioxide and 0.1–1% oxygen. In this case it is to be noted that plasma 120 has a generally diverging or conical shape and extends from above the tip 122 of electrode 124 to a base surrounding the weld puddle 126 and maintains a substantially constant base width of approximately 0.4 inch with a height of 0.3 to 0.5 inch. As noted, while the size and shape of plasma 120 fluctuate during the welding process, it generally retains its diverging or conical form and maintains a closely surrounding relationship with respect to the electrode and the weld puddle.

The welding deposition rate parameters of the third film using applicant's mild steel shielding gas mixture, supra, are:

| Wire speed | 650"/min. |
|---|---|
| Melt-off rate | 23 lbs./hr. |
| Welding speed | 36"/min. |

As viewed in the third film of applicant's process, depicted in FIGS. 20–22, there is a pulsing action which occurs in the plasma associated with the formation of the globules 128 which before separation from the electrode are slightly to substantially larger than the electrode diameter. It is also recorded that such large globules were formed at the rate of 800 per second. For comparison purposes, it is to be noted that in a typical short-circuiting or short arc process molten electrode drops transfer or enter the weld puddle at the rate of about 90 drops or globules per second. It is also observed that the molten globules of applicant's process enter the weld pool without any tendency to splash or wash out. It is believed that the persistence of the closely enveloping plasma 120 and the substantial pre-heat of the substrate 130–132 contribute importantly to the retention of the globules within the pool and the avoidance of spattering.

It is also to be noted that applicant's molten globules 128 were at least of the size of the electrode diameter (0.052 in.) and actually ranged from 0.056 to 0.126 inch. The fine droplets 102 of the Spray Arc Transfer depicted in FIGS. 14–16 were too small for practical measurement. On the other hand, since the globules 112 of FIGS. 17–19 were normally transferred by short-circuiting, it was not feasible to accurately determine their size although they probably approach the diametral size of the electrode.

It is believed that the pulsing action associated with applicant's formation and transfer of large globules at the high rate of 400–1200 globules per second into the molten puddle contributes importantly to the improved weld quality as described with reference to FIGS. 5–13.

As hereinbefore set forth, by utilizing electrode sizes and current densities at or close to the practical maximums useable with heretofore high deposition rate GMA welding processes, applicant's invention has achieved substantially improved weld deposition rates and qualities. For example and as previously noted in reference to FIGS. 5–13, using similar operating parameters, except for shielding gases, applicant's invention achieves a weld deposition rate 160% faster than prior art welding processes with greatly improved weld joint quality.

By employing electrode sizes and current densities substantially larger than those practicably useful with heretofore known shielding gases or gas mixtures, applicant has achieved greatly improved weld joint quality and weld deposition rates. By way of further example, applicant has welded mild steel plates using a 0.052 diameter electrode with the following parameters and results:

| Shielding gas | 65.0% argon; |
| --- | --- |
| | 26.5% helium; |
| | 8.0% carbon dioxide; |
| | 0.5% oxygen |
| Wire speed feed | 1300 in./min. |
| Melt-off rate | 46.8 lbs./hr. |
| Current density | 450,000 amps/sq. in. |
| Voltage | 38–42 |

In the above and all other preferred welding gas mixtures, the argon is present in an amount from 0.5 to 3.5 parts by volume for each one part by volume helium.

Another unique result achieved with applicant's process is the ability to achieve a 100% weld joining steel plates of up to ½ inch thicknesses. For example, a pair of aligned ½ inch steel plates are placed in abutting and aligned positions without any prior preparation of the abutting edges; using applicant's mild steel welding gas mixture, supra, a first welded joint or bead is made along the length of the abutting edges on one side of the plates and, then, a second bead is made along the length of the abutting edges on the opposite side of the plates. A cross section through the welded joint reveals that the first and second beads have merged or flowed together giving a 100% weld. To applicant's knowledge, such 100% weld in ½ inch steel plates has not been achieved by any Gas Metal-Arc process.

Other improved results are possible within the intended scope of the invention as set forth in the hereinafter appended claims.

What is claimed is:

1. An electric gas welding process of the type utilized with a welding gun having a consumable electrode-receiving tip, a nozzle coaxial with said tip and radially spaced therefrom to form an annular gas passage, such process including feeding the welding electrode toward a metal joint to be welded, passing current through the electrode to create an electric arc between the end of said electrode and the metal joint, said current melting the end portion of said electrode to cause molten electrode material to be transferred to and fill the weld joint and flowing welding gas through the nozzle to supply the plasma to said electrode and said weld joint, the improvement in said process comprising:
   (a) a welding gas mixture consisting essentially of:
      (1) argon from 40% to 70%
      (2) helium from 25% to 60%
      (3) carbon dioxide from 3% to 10%
      (4) oxygen from 0.10% to 1%, and
   (b) a current of a magnitude to form molten globules at the tip of the electrode at the rate of 400 to 1200 globules per second, and
   (c) wherein said globules are of a diametral size at least as large as the diameter of said electrode.

2. An electric arc process for the welding of mild and low alloy steel, said process being of the type utilized with a welding gun having a consumable electrode-receiving tip, a nozzle coaxial with said tip and radially spaced therefrom to form an annular gas passage, such process including feeding the welding electrode toward a metal joint to be welded, passing current through the electrode to create an electric arc between the end of said electrode and the metal joint, said current melting the end portion of said electrode to cause molten electrode material to be transferred to and fill the weld joint and flowing gas through the nozzle to produce an arc plasma between said electrode and said weld joint, the improvement in said process comprising:
   (a) a welding gas mixture consisting essentially of:
      (1) argon—65.0%
      (2) helium—26.5%
      (3) carbon dioxide—8.0%
      (4) oxygen—0.5%
   (b) a current of a magnitude to form molten globules at the tip of the electrode at the rate of 400 to 1200 globules per second.

3. An electric gas welding process as set forth in claim 2 wherein said globules are of diametral size at least as large as the diameter of said electrode.

4. An electric arc process for the welding of low alloy, quenched and tempered steel, said process being of the type utilized with a welding gun having a consumable electrode-receiving tip, a nozzle coaxial with said tip and radially spaced therefrom to form an annular gas passage, such process including feeding the welding electrode toward a metal joint to be welded, passing current through the electrode to create an electric arc between the end of said electrode and the metal joint, said current melting the end portion of said electrode to cause molten electrode material to be transferred to and fill the weld joint and flowing gas through the nozzle to produce an arc plasma between said electrode and said weld joint, the improvement in said process comprising:
   (a) a welding gas mixture consisting essentially of:
      (1) argon—44.00%
      (2) helium—52.00%
      (3) carbon dioxide—3.82%
      (4) oxygen—0.18%
   (b) a current of a magnitude to form molten globules at the tip of the electrode at the rate of 400 to 1200 globules per second.

5. An electric welding process as set forth in claim 4 wherein said globules are of a diametral size at least as large as the diameter as said electrode.

6. An electric arc process for the welding of stainless steel, said process being of the type utilized with a welding gun having a consumable electrode-receiving tip, a nozzle coaxial with said tip and radially spaced therefrom to form an annular gas passage, such process including feeding the welding electrode toward a metal joint to be welded, passing current through the electrode to create an electric arc between the end of said electrode and the metal joint, said current melting the end portion of said electrode to cause molten electrode material to be transferred to and fill the weld joint and flowing gas through the nozzle to produce an arc plasma between said electrode and said weld joint, the improvement in said process comprising:
   (a) a welding gas mixture consisting essentially of:
      (1) argon—41.66%
      (2) helium—55.00%
      (3) carbon dioxide—3.20%
      (4) oxygen—0.14%
   (b) a current of a magnitude to form molten globules at the tip of the electrode at the rate of 400 to 1200 globules per second.

7. An electric gas welding process as set forth in claim 6 wherein said globules are of a diametral size at least as large as the diameter of said electrode.

8. A gas mixture for use with an electric arc welding process, said mixture consisting essentially of:
(a) argon from 40% to 70%
(b) helium from 25% to 60%
(c) carbon dioxide from 3% to 10%
(d) oxygen from 0.10% to 1%.

9. A gas mixture for use in the electric arc welding of mild and low alloy steels, said mixture consisting essentially of:
(a) argon—65.0%
(b) helium—26.5%
(c) carbon dioxide—8.0%
(d) oxygen—0.5%

10. A gas mixture for use in the electric arc welding of low alloy, quenched and tempered steels, said mixture consisting essentially of:
(a) argon—44.00%
(b) helium—52.00%
(c) carbon dioxide—3.82%
(d) oxygen—0.18%

11. A gas mixture for use in the electric arc welding of stainless steels, said mixture consisting essentially of:
(a) argon—41.66%
(b) helium—55.00%
(c) carbon dioxide—3.20%
(d) oxygen—0.14%

* * * * *